(12) United States Patent
Saito

(10) Patent No.: US 7,745,510 B2
(45) Date of Patent: Jun. 29, 2010

(54) INK COMPOSITION FOR INK JET RECORDING, AND RECORDING METHOD AND RECORDED MATTER USING THE SAME

(75) Inventor: Chie Saito, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 517 days.

(21) Appl. No.: 11/393,010

(22) Filed: Mar. 29, 2006

(65) Prior Publication Data

US 2006/0241210 A1 Oct. 26, 2006

(30) Foreign Application Priority Data

Mar. 29, 2005 (JP) ............... P.2005-094832

(51) Int. Cl.
*C09D 11/00* (2006.01)

(52) U.S. Cl. ............... 523/160; 523/161; 523/215; 524/424; 524/560; 524/577; 106/31.6; 106/31.65; 106/31.9

(58) Field of Classification Search ............... None
See application file for complete search history.

(56) References Cited

U.S. PATENT DOCUMENTS

| | | | |
|---|---|---|---|
| 6,379,443 B1 * | 4/2002 | Komatsu et al. | 106/31.58 |
| 6,447,974 B1 * | 9/2002 | Chen et al. | 430/137.14 |
| 6,500,248 B1 * | 12/2002 | Hayashi | 106/31.86 |
| 6,569,589 B2 * | 5/2003 | Inaba et al. | 430/108.22 |
| 6,572,969 B1 * | 6/2003 | Samaranayake | 428/407 |
| 7,338,988 B2 * | 3/2008 | Hesler et al. | 523/160 |
| 2005/0137283 A1 * | 6/2005 | Frese et al. | 523/160 |

FOREIGN PATENT DOCUMENTS

| | | |
|---|---|---|
| JP | 1-217088 | 8/1989 |
| JP | 4-18462 | 1/1992 |
| JP | 8-3498 | 1/1996 |
| JP | 8-259869 | 10/1996 |
| JP | 10-46073 | 2/1998 |
| JP | 2002-265831 | 9/2002 |
| JP | 2002-338859 | 11/2002 |
| JP | 2003-96109 | 4/2003 |
| JP | 2003-306611 | 10/2003 |

OTHER PUBLICATIONS

Computer-Generated English Translation of Claims and Specification and Patent Abstracts of Japan of JP 2003-306611 dated Oct. 31, 2003.
Computer-Generated English Translation of Claims and Specification and Patent Abstracts of Japan of JP 2003-96109 dated Apr. 3, 2003.
Computer-Generated English Translation of Claims and Specification and Patent Abstracts of Japan of JP 2002-338859 dated Nov. 27, 2002.
Computer-Generated English Translation of Claims and Specification and Patent Abstracts of Japan of JP 2002-265831 dated Sep. 18, 2002.
Computer-Generated English Translation of Claims and Specification and Patent Abstracts of Japan of JP 10-46073 dated Feb. 17, 1998.
Computer-Generated English Translation of Claims and Specification and Patent Abstracts of Japan of JP 8-259869 dated Oct. 8, 1996.
Computer-Generated English Translation of Claims and Specification and Patent Abstracts of Japan of JP 8-3498 dated Jan. 9, 1996.
Patent Abstracts of Japan of JP 4-18462 dated Jan. 22, 1992.
Patent Abstracts of Japan of JP 1-217088 dated Aug. 30, 1989.

* cited by examiner

*Primary Examiner*—David Wu
*Assistant Examiner*—Vu Nguyen
(74) *Attorney, Agent, or Firm*—Ladas and Parry LLP

(57) ABSTRACT

The invention provides an ink composition for ink jet recording comprising at least a resin emulsion and a surface-treated pigment, wherein the amount of monomers and oligomers with a molecular weight of 2,000 or less contained in the resin emulsion is 1,000 ppm or less based on the total amount of the ink composition. Also disclosed are an ink jet recording method using the ink composition and recorded matter obtained by the recording method.

7 Claims, No Drawings

INK COMPOSITION FOR INK JET RECORDING, AND RECORDING METHOD AND RECORDED MATTER USING THE SAME

FIELD OF THE INVENTION

The present invention relates to an ink composition for ink jet recording which gives sufficient fixing properties to recorded matter, has high density, and is good in ejection stability and storage stability. Further, the invention relates to a recording method and recorded matter using the same.

BACKGROUND OF THE INVENTION

The ink jet recording method is a printing method in which droplets of an ink are allowed to fly and deposited on a recording medium such as paper to perform printing. As the ink, there has been generally used one in which various water-soluble dyes are dissolved in water or a mixture of water and a water-soluble organic solvent. It has been generally pointed out that recorded matter obtained by using such a water-soluble dye-containing ink is poor in water resistance and light resistance.

In contrast, an ink obtained by dispersing a pigment in an aqueous medium is excellent in water resistance and light resistance. For example, there has been proposed an aqueous pigment ink obtained by dispersing a pigment by using a surfactant or a polymeric dispersing agent. Further, there has been disclosed a surface-treated pigment ink in which only a pigment can be dispersed in an aqueous solvent even when a dispersing agent such as the surfactant or polymeric dispersing agent as described above does not exist (for example patent document 1).

Generally, however, an ink using a pigment has the problems of insufficient fixing properties of the ink to recorded matter and poor rubbing resistance. That is to say, in the recorded matter obtained by using the ink in which the pigment is used as a coloring agent, the coloring agent component is liable to remain near a surface of the recorded matter. Accordingly, when the coloring agent is not sufficiently fixed to the surface of the recorded matter, there are problems in rubbing resistance, such that an image becomes dirty on rubbing with the finger or marking with a marker pen. In particular, when the pigment concentration is increased in order to increase the print density, or when a design is made so that the pigment is remained on a surface of a recording medium without penetrating it, these problems are significant.

In order to improve such fixing properties of the pigment to the recorded matter, it has been proposed that a resin is added to the ink. This resin is considered to firmly fix the pigment onto the recorded matter as a binder. As such inks, there have been disclosed an ink containing a resin emulsion having a specific film-forming temperature (for example, patent documents 2 and 3) and an ink containing core-shell type resin particles each composed of a core portion and a shell portion enclosing it (for example, patent document 4).

Further, there has been disclosed an ink in which the amount of monomers contained in the polymeric dispersing agent and resin emulsion added to the ink in order to stably disperse the pigment is adjusted to 1,000 ppm or less (for example, patent document 5). Printing using this ink causes no irregular penetration to the recorded matter, so that an image of higher image quality can be stably obtained under diversified environments regardless of their environmental variation. Furthermore, unpleasant odors do not happen to occur during printing and after printing.

However, the ink for ink jet recording disclosed in this patent document 5 is an aqueous pigment ink in which the pigment is dispersed by using the polymeric dispersing agent. In such an ink, when the content of the pigment in the ink is increased in order to increase the print density of the printed matter, the ink viscosity also rapidly increases therewith in some cases. Further, the polymeric dispersing agent is excessively required to stably disperse the pigment in the ink, so that there has been the problem of insufficient ejection stability because of air bubble generation and a reduction in defoaming properties, In addition, there has been disclosed an emulsified polymer in which the content of low-molecular weight components (oligomers) is specified to a specific amount or less (for example, patent document 6). By specifying the oligomer component content of the emulsified polymer to a specific amount or less, excellent durability and water resistance are realized when it is added to a paint or an adhesive. However, it is not suggested that this emulsified polymer is used as an additive to the ink for ink jet recording. Further, the upper limits of the specified molecular weight and content of the oligomers are relatively large. Accordingly, when it is applied to the ink for ink jet recording, there has been the possibility of causing defects such as unstable ejection.

Patent Document 1: JP-A-8-3498
Patent Document 2: JP-A-1-217088
Patent Document 3: JP-A-4-18462
Patent Document 4: JP-A-8-259869
Patent Document 5: JP-A-10-46073
Patent Document 6: JP-A-2003-96109

SUMMARY OF THE INVENTION

The invention has been made for dissolving the above-mentioned problems. That is to say, an object of the invention is to provide an ink composition for ink jet recording which gives sufficient fixing properties to recorded matter, has high density, and is good in ejection stability and storage stability.

Other objects and effects of the invention will become apparent from the following description.

As a result of investigations and studies, the present inventors have found that an ink composition for ink jet recording which solves the above-mentioned problems can be obtained by allowing the composition to contain at least a resin emulsion and a surface-treated pigment, and adjusting the amount of monomers and oligomers with a molecular weight of 2,000 or less contained in the above-mentioned resin emulsion to 1,000 ppm or less based on the total amount of the ink composition. That is to say, the invention provides the following ink compositions, ink jet recording method and recorded matter:

(1) An ink composition for ink jet recording comprising at least a resin emulsion and a surface-treated pigment, wherein the amount of monomers and oligomers with a molecular weight of 2,000 or less contained in the resin emulsion is 1,000 ppm or less based on the total amount of the ink composition;

(2) The ink composition according to item (1) above, wherein the above-mentioned resin emulsion contains at least one monomer selected from the group consisting of a alkyl (meth)acrylate and an aromatic vinyl compound, as a copolymerization monomer(s);

(3) The ink composition according to item (1) or (2) above, wherein the content of the above-mentioned resin emulsion is within the range of 1 to 10% by weight based on the total amount of the ink composition;

(4) The ink composition according to any one of items (1) to (3) above, wherein the above-mentioned surface-treated pigment is a surface-treated pigment which is dispersed mainly by a carboxyl group existing on a surface of the pigment;

(5) The ink composition according to any one of items (1) to (4) above, wherein the above-mentioned surface-treated pigment is a surface-treated carbon black;

(6) The ink composition according to any one of items (1) to (5) above, wherein the above-mentioned surface-treated pigment has an average particle size ranging from 100 to 200 nm;

(7) The ink composition according to any one of items (1) to (6) above, wherein the content of the above-mentioned surface-treated pigment is within the range of 2 to 15% by weight based on the total amount of the ink composition;

(8) An ink jet recording method comprising ejecting droplets of an ink and depositing the droplets on a recording medium to perform printing, wherein the ink is the ink composition according to any one of items (1) to (7) above; and (9) Recorded matter recorded by the ink jet recording method according to item (8) above.

As has been described in detail above, according to the invention, there is provided the ink composition for ink jet recording which gives sufficient fixing properties to recorded matter, has high density, and is good in ejection stability and storage stability. Further, there are suitably provided the recording method using the above-mentioned ink composition, and the recorded matter.

DETAILED DESCRIPTION OF THE INVENTION

The invention will be illustrated in detail based on preferred embodiments thereof.

The ink composition for ink jet recording of the invention comprises at least a resin emulsion and a surface-treated pigment. The resin emulsion, which is added for the purpose of improving fixing properties of the pigment in the ink to form images such as letters and figures excellent in rubbing resistance on the recorded matter, is incorporated into the ink composition in a form of an emulsion of resin particles obtained by emulsion polymerization of an unsaturated monomer, in order to secure dispersion stability thereof in the ink composition. The resin emulsion used in the ink composition for ink jet recording of the invention can be obtained by known emulsion polymerization methods. For example, an unsaturated monomer such as an alkyl (meth)acrylate or an aromatic vinyl compound is emulsion polymerized as a copolymerization component in water in which a polymerization initiator and a surfactant are allowed to exist, thereby being able to obtain the resin emulsion.

The ink composition for ink jet recording of the invention is characterized in that the amount of monomers and oligomers with a molecular weight of 2,000 or less contained in the resin emulsion is 1,000 ppm or less based on the total amount of the ink composition. The term "oligomer" as used herein means an oligomer whose number of repetitions of a monomer (polymerization degree) is about 2 to 20. Deterioration of ejection properties and storage properties caused by incorporation of the monomer and oligomer components to the ink composition can be prevented by using the resin emulsion in an amount of 1,000 ppm or less based on the total amount of the ink composition. Accordingly, stability of the ink composition as the whole system thereof can be improved while securing high fixing performance, and the ink composition stable in ejection properties and storage properties can be realized. Further, even when the amount of the resin emulsion is increased, a substantial increase in ink viscosity can be inhibited. In addition to that, foaming of the ink can also be inhibited. Furthermore, when printing is performed on a recording medium, unpleasant odors or poisonous gases due to vapors thereof are not generated.

The term "monomers and oligomers with a molecular weight of 2,000 or less contained in the resin emulsion" as used herein means monomers and oligomers mixed in the above-mentioned resin emulsion for various reasons. For example, they include an unreacted monomer which remains in the resin emulsion, as a raw material monomer used in preparing the resin emulsion is partially left unreacted, and an oligomer which remains in the resin emulsion in a state where the polymerization has completed almost without proceeding.

The resin emulsion which contains monomers and oligomers with a molecular weight of 2,000 or less in reduced amounts can be prepared by directly preparing such a resin emulsion, or by removing monomers and oligomers with a molecular weight of 2,000 or less from a conventional resin emulsion (containing monomers and oligomers with a molecular weight of 2,000 or less in relatively large amounts) obtained by a conventional method.

In order to directly prepare the resin emulsion which contains monomers and oligomers with a molecular weight of 2,000 or less in reduced amounts, a polymerization initiator is further additionally added in a reaction process of emulsion polymerization, immediately before the termination of the reaction process, to polymerize the monomers and oligomers, thereby being able to reduce the content thereof. For example, a styrene-methyl acrylate copolymer emulsion which contains monomers and oligomers with a molecular weight of 2,000 or less in reduced amounts can be prepared by adding as a radical activity-imparting agent a peroxide such as ammonium persulfate at a final stage of the copolymerization reaction of styrene and methyl acrylate.

As the polymerization initiator, there can be used a polymerization initiator similar to one used in ordinary radical polymerization, in addition to ammonium persulfate. Examples thereof include potassium persulfate, hydrogen peroxide, azobisisobutyronitrile, benzoyl peroxide, dibutyl peroxide, peracetic acid, cumene hydroperoxide, t-butyl hydroxyperoxide and paramenthane hydroxyperoxide. In particular, when the polymerization reaction is conducted in water, a water-soluble polymerization initiator is preferred.

Further, in order to remove monomers and oligomers from the resin emulsion which contains monomers and oligomers with a molecular weight of 2,000 or less in relatively large amounts, a method of distilling the emulsion under reduced pressure can be utilized. For example, in order to remove monomers and oligomers with a molecular weight of 2,000 or less from the styrene-methyl acrylate copolymer emulsion, there can be used a method of distilling the emulsion under reduced pressure or adding the persulfate such as ammonium persulfate, followed by heating reaction in a nitrogen atmosphere.

The content of monomers and oligomers with a molecular weight of 2,000 or less can be measured, for example, by gas chromatography. As for measuring devices according to gas chromatography, for example, a flame ionization detector (FID) can be used as a gas chromatograph detector, an adsorbent of a phenylene oxide-based porous polymer can be used as a filler in a glass column, and helium can be used as a carrier gas.

The ink composition for ink jet recording of the invention is characterized in that the above-mentioned resin emulsion contains at least one monomer selected from the group consisting of a alkyl (meth)acrylate and an aromatic vinyl compound, as an indispensable copolymerization monomer(s) The glass transition temperature (Tg) of the resin emulsion can be relatively easily controlled by using a monomer(s) selected from the above-mentioned group, as a copolymerization component(s), and arbitrarily adjusting the kind and ratio thereof. This makes it possible to add the resin emulsion in a state where functions such as fixing properties which are required as a resin to be added to the ink for ink jet recording are arbitrarily controlled.

Specific examples of the alkyl (meth)acrylates applicable to the invention include methyl acrylate, ethyl acrylate, isopropyl acrylate, n-butyl acrylate, isobutyl acrylate, n-amyl acrylate, isoamyl acrylate, n-hexyl acrylate, 2-ethylhexyl acrylate, octyl acrylate, decyl acrylate, dodecyl acrylate, octadecyl acrylate, cyclohexyl acrylate, phenyl acrylate, benzyl acrylate, glycidyl acrylate, methyl methacrylate, ethyl methacrylate, isopropyl methacrylate, n-butyl methacrylate, isobutyl methacrylate, n-amyl methacrylate, isoamyl methacrylate, n-hexyl methacrylate, 2-ethylhexyl methacrylate, octyl methacrylate, decyl methacrylate, dodecyl methacrylate, octadecyl methacrylate, cyclohexyl methacrylate, phenyl methacrylate, benzyl methacrylate and glycidyl methacrylate. Further, specific examples of the aromatic vinyl compounds include styrene, α-methylstyrene, vinyltoluene, 4-t-butylstyrene, chlorostyrene, vinylanisole and vinylnaphthalene.

In the resin emulsion used in the ink composition for ink jet recording of the invention, there can be used monomers which are generally used as copolymerization components in emulsion polymerization, as well as the unsaturated monomers described above. Specific examples thereof include vinyl esters such as vinyl acetate, vinyl cyanide compounds such as acrylonitrile and methacrylonitrile, halide monomers such as vinylidene chloride and vinyl chloride, olefins such as ethylene and propylene, dienes such as butadiene and chloroprene, vinyl monomers such as vinyl ether, vinyl ketone and vinyl pyrrolidone, unsaturated carboxylic acids such as acrylic acid, methacrylic acid, itaconic acid, fumaric acid and maleic acid, acrylamides such as acrylamide, methacrylamide and N,N'-dimethylacrylamide, and hydroxyl group-containing monomers such as 2-hydroxyethyl acrylate, 2-hydroxypropyl acrylate, 2-hydroxyethyl methacrylate and 2-hydroxypropyl methacrylate.

Further, a crosslinkable monomer having two or more polymerizable double bonds can also be used. Specific examples thereof include diacrylate compounds such as polyethylene glycol diacrylate, triethylene glycol diacrylate, 1,3-butylene glycol diacrylate, 1,4-butylene glycol diacrylate, 1,6-hexanediol diacrylate, neopentyl glycol diacrylate, 1,9-nonanediol diacrylate, polypropylene glycol diacrylate, 2,2'-bis(4-acryloxypropyloxyphenyl)propane and 2,2'-bis(4-acryloxydiethoxyphenyl)propane; triacrylate compounds such as trimethylolpropane triacrylate, trimethylolethane triacrylate and tetramethylolmethane triacrylate; tetra-acrylate compounds such as ditrimethylol tetraacrylate, tetramethylolmethane tetraacrylate and pentaerythritol tetraacrylate; hexaacrylate compounds such as dipentaerythritol hexaacrylate; dimethacrylate compounds, such as ethylene glycol dimethacrylate, diethylene glycol dimethacrylate, triethylene glycol dimethacrylate, polyethylene glycol dimethacrylate, 1,3-butylene glycol dimethacrylate, 1,4-butylene glycol dimethacrylate, 1,6-hexanediol dimethacrylate, neopentyl glycol dimethacrylate, dipropylene glycol dimethacrylate, polypropylene glycol dimethacrylate, polybutylene glycol dimethacrylate and 2,2'-bis(4-methacryloxydiethoxyphenyl)propane; trimethacrylate compounds such as trimethylolpropane trimethacrylate and trimethylolethane trimethacrylate; methylene bisacrylamide; and divinylbenzene.

Emulsifiers used in the polymerization reaction include, for example, an emulsifier generally used as an anionic surfactant, a nonionic surfactant or an amphoteric surfactant, as well as sodium lauryl sulfate.

In the polymerization reaction of the resin emulsion of the invention, a chain transfer agent and further a neutralizer may also be used in accordance with a conventional method, in addition to the polymerization initiator and surfactant used in the polymerization reaction.

The chain transfer agents include, for example, t-dodecyl mercaptan, n-dodecyl mercaptan, n-octyl mercaptan, xanthogens such as dimethylxanthogen disulfide or diisobutylxanthogen disulfide, dipentene, indene, 1,4-cyclohexadiene, dihydrofuran and xanthene.

Further, as the neutralizers, preferred are ammonia and an inorganic alkali hydroxide such as sodium hydroxide and potassium hydroxide.

In the invention, the content of the resin emulsion is preferably from 1 to 10% by weight, and more preferably from 2 to 5% by weight, based on the total amount of the ink composition of the invention. When the content of the resin emulsion is 1% by weight or more, more preferably 2% by weight or more, fixing properties of the recorded matter can be more effectively obtained. Further, when the content of the resin emulsion is 10% by weight or less, more preferably 5% by weight or less, adjustment to ink jet optimum physical property values is easy, further, good ejection stability and storage stability can be obtained, and reliability such as nozzle clogging resistance can be improved.

It is preferred that the ink composition for ink jet recording of the invention comprises a surface-treated pigment. The term "surface-treated pigment" as used in the invention means a pigment which is contained as a coloring agent in an aqueous dispersion, to a surface of which a number of hydrophilic functional groups and/or salts thereof are bonded directly or indirectly through a multivalent group or the like, and which can be dispersed and/or dissolved in an aqueous medium without using any dispersing agent. The term "dispersed and/or dissolved in an aqueous medium without using any dispersing agent" as used herein means a state where the pigment stably exists in an aqueous medium at the minimum dispersible particle size even when no dispersing agent is used. The term "the minimum dispersible particle diameter" as used herein means the particle size of the pigment which is not decreased any more even when the dispersing time is prolonged.

Examples of the hydrophilic functional groups to be bonded to the surface of the above-mentioned surface-treated pigment include a carboxyl group, a sulfonic acid group, a carbonyl group, a hydroxyl group and an ammonium group.

In the surface-treated pigment of the invention, surfaces of pigment particles are subjected to reaction treatment such as oxidation and/or physical/chemical treatment, thereby imparting the hydrophilic functional groups as described above to the surfaces of the pigment particles and dispersing the pigment particles in an aqueous system. Examples of these surface treatment methods include an oxidation method by air contact, a gas phase oxidation method by reaction with a nitrogen oxide or ozone, a low-temperature plasma oxidation method using an oxide such as carbon dioxide, a liquid phase oxidation method using an oxidizing agent such as nitric acid, potassium permanganate hydrogen peroxide or an aqueous ozone solution, a wet oxidation method using a hypohalogen acid or a salt thereof, a method by a sulfone oxide, vacuum plasma treatment and a method of bonding a carboxyl group through a phenyl group by bonding p-aminobenzoic acid to the surface of the pigment.

The aqueous dispersion and aqueous ink composition containing the above-mentioned surface-treated pigment as the coloring agent is not required to contain the dispersing agent as described above which is allowed to be contained for dispersing a conventional pigment. Accordingly, deterioration of defoaming properties and foaming due to the dispersing agent scarcely occur, so that it is easily handled. In particular, according to the ink composition for ink jet recording of the invention prepared by using the above-mentioned resin emulsion as the indispensable constituent of the invention in combination with the above-mentioned surface-treated pigment, it is possible to obtain various characteristics such as desired color developing properties and fixing properties, ejection stability and storage stability, at high levels, easily in a balanced manner.

The ink composition for ink jet recording of the invention comprises the surface-treated pigment which is mainly dispersed particularly by the carboxyl group existing on the pigment surface, among the above-mentioned hydrophilic functional groups. The surface-treated pigment which is mainly dispersed by the carboxyl group existing on the pigment surface is obtained by the above-mentioned various oxidation methods. In the invention, however, it is preferably the surface-treated pigment obtained by wet oxidation using a hypohalogen acid or a salt thereof. According to this technique, the carboxyl group can be imparted to the pigment surface, effectively and relatively easily. Examples of the hypohalogen acid or salts thereof include sodium hypochlorite and potassium hypochlorite, and sodium hypochlorite is particularly preferred from the point of reactivity. The oxidation of the pigment is generally performed by charging the pigment and the hypohalogen acid salt in an amount of 10 to 30% by effective halogen concentration based on the weight of the pigment in an appropriate amount of water, followed by stirring at 50° C. or higher, preferably at 95 to 105° C., for 5 hours or more, preferably for about 10 to about 15 hours.

The ink composition comprising the surface-treated pigment which is mainly dispersed by the carboxyl group existing on the pigment surface, which is obtained by any one of the above-mentioned methods, is generally characterized by that even when the recorded matter is immersed in water, the pigment does not happen to flow out to provide water resistance, and that the recorded matter is excellent in density to give high OD value. On the other hand, the surface-treated pigment which is mainly dispersed by the carboxyl group existing on the pigment surface generally has a tendency to be somewhat poor in ejection stability, compared to the surface-treated pigment which is mainly dispersed by the functional group other than the carboxyl group existing on the pigment surface. However, it becomes possible to obtain stable ejection properties on a level practically having no problem as the ink composition for ink jet recording by using it in combination with the above-mentioned emulsion as the indispensable constituent of the invention.

The ink composition for ink jet recording of the invention can be most suitably used by using a surface-treated carbon black as the above-mentioned surface-treated pigment. As a carbon black used as a raw material for the surface-treated carbon black, there can be used one generally commercially available as a carbon black for color applications. Specifically, the carbon blacks are classified according to their pH into three types: an acidic carbon black, a neutral carbon black and a basic carbon black. Further, they are classified according to their production process into four types: a furnace type carbon black, a channel type carbon black, an acetylene type carbon black and a thermal type carbon black, any one of which can be used. It is particularly preferred that the surface-treated carbon black in the invention is one obtained by oxidation treatment of the acidic carbon black, of the carbon blacks classified above. The oxidation treatment of the carbon black comprises the steps of pulverizing the raw material carbon black, and subsequently or nearly simultaneously oxidizing the pulverized carbon black, and both the steps require an oxidizing agent. The acidic carbon black has many hydroxyl groups such as carboxyl groups on its surface, so that it is easy to adapt to an aqueous medium and easily pulverized. Accordingly, the oxidizing agent is unnecessary at the time of pulverization, so that the amount of the oxidizing agent used in the oxidation treatment can be decreased. Specific examples of the acidic carbon blacks suitably used in the invention include #50, MA8 and MA100 (manufactured by Mitsubishi Chemical Corporation), Color Black FW1, Color Black Color Black FW18, Color Black FW200, Color Black S170 and Special Black 250 (manufactured by Degussa Corporation), Raven 3500, Raven 1080 and Raven C (manufactured by Columbian Carbon Company), and Monarch 1300 and Regal 400R (manufactured by Cabot Corporation). The above description is to be taken as an embodiment of the carbon black suitable in the invention, and the invention should not be construed as being limited thereby.

It is also possible to use commercially available products as the above-mentioned surface-treated carbon blacks, and Microjet CW 1 (manufactured by Orient Chemical Industries, Ltd.) and CAB-O-JET200 and CAB-O-JET300 (manufactured by Cabot Corporation) can be exemplified.

In the ink composition for ink jet recording of the invention, the average particle size of the pigment is preferably within the range of 100 to 200 nm, and more preferably within the range of 100 to 160 nm. When the average particle size of the pigment is 100 nm or more, dispersion stability is improved, so that good storage stability and ejection stability can be obtained. Further, the high OD value of the recorded matter can be secured. Furthermore, when the average particle size of the pigment is 200 nm or less, nozzle clogging can be prevented, and further, sedimentation of the pigment can also be inhibited.

The ink composition for ink jet recording of the invention is produced using the various surface-treated pigments which have been described above, and characterized in that the content of the pigment based on the total amount of the ink composition is within the range of 2 to 15% by weight. When the pigment content in the ink composition is 2% by weight, the high OD value of the printed recorded matter can be secured, and the desired qualities can be satisfied. Further, when the pigment content is 15% by weight or less, a rapid increase in ink initial viscosity does not occur. Accordingly, adjustment to ink jet optimum physical property values is easy, more stable ejection stability and storage stability can be obtained, and reliability such as nozzle clogging resistance can be improved.

Besides, in the ink composition for ink jet recording of the invention, an organic solvent can also be used as a solvent in combination with water. Such an organic solvent is preferably a solvent which has compatibility with water, improves permeability of the ink composition in the recording medium and nozzle clogging resistance, and improves solubility of a component such as a penetrant in the ink composition, which will be described later. The organic solvents include, for example, alkyl alcohols having 1 to 4 carbon atoms such as ethanol, methanol, butanol, propanol and isopropanol; glycol ethers such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-t-butyl ether, 1-methyl-1-methoxybutanol, propylene glycol monomethyl ether, propylene glycol monoethyl ether, propylene glycol mono-n-propyl ether and dipropylene glycol mono-iso-propyl ether; 2-pyrrolidone; formamide; dimethyl sulfoxide; sorbit; sorbitan; acetin; diacetin; triacetin and sulfolane. One or two or more kinds of these solvents can be used in the ink composition of the invention, preferably in an amount of 0 to 10% by weight.

From the point of improving print quality, the ink composition for ink jet recording of the invention is preferably allowed to contain a surfactant. The surfactant can be selected from an anionic surfactant, a cationic surfactant, an amphoteric surfactant and a nonionic surfactant which are generally used. Of these, the nonionic surfactant is particularly preferred. Specific examples of the nonionic surfactants include an acetylene glycol-based surfactant, an acetylene alcohol-based surfactant, a polyoxyethylene alkyl ether and a polyoxyethylene phenyl ether. The use of these surfactants can provide the ink composition which produces little foaming, compared to the ionic surfactant. Further, of the nonionic surfactants, the acetylene glycol-based surfactant is particularly preferred when used in ink jet recording, because the ink composition which scarcely produces foaming can be obtained. Such acetylene glycol-based surfactants include, for example, 2,4,7,9-tetramethyl-5-decyne-4,7-diol, 3,6-dimethyl-4-octyne-3,6-diol, 3,5-dimethyl-1-hexyne-3-ol and a substance in which on the average 1 to 30 ethyleneoxy groups or propyleneoxy groups are added to each of a plurality of hydroxyl groups in each of these materials. Furthermore, commercially available products can also be used, and examples thereof include Olfine E 1010 and Olfine STG (manufactured by Nissin Chemical Industry Co., Ltd.). One or two or more kinds thereof can be used. The content of the acetylene glycol-based surfactant in the ink composition of the invention is preferably from 0.1 to 3% by weight, and more preferably from 0.5 to 1.5% by weight.

In order to more improve fixing properties to the recording medium to enhance rubbing resistance of recorded images, the ink composition for ink jet recording of the invention is preferably allowed to contain a penetrant. As such penetrants, preferred are glycol ethers such as diethylene glycol mono-n-butyl ether, diethylene glycol mono-t-butyl ether, triethylene glycol mono-n-butyl ether, propylene glycol mono-n-butyl ether and dipropylene glycol mono-n-butyl ether. In particular, diethylene glycol mono-n-butyl ether, triethylene glycol mono-n-butyl ether and dipropylene glycol mono-n-butyl ether are preferred from the viewpoints of their excellent penetrating performance and easy handling. The content of the penetrant in the composition of the invention is preferably from 1 to 20% by weight, and more preferably from 2 to 10% by weight, in terms of improved penetrating properties and quick-drying properties of the ink composition and effective prevention of the occurrence of ink blurring.

In order to prevent nozzle clogging to further enhance reliability, the ink composition for ink jet recording of the invention is preferably allowed to contain a water-soluble glycol. Such water-soluble glycols include, for example, dihydric alcohols such as ethylene glycol, diethylene glycol, triethylene glycol, tetraethylene glycol, propylene glycol, dipropylene glycol, tripropylene glycol, polyethylene glycol having a molecular weight of 2,000 or less, 1,3-propylene glycol, isobutylene glycol, 1,4-butanediol, 1,3-butanediol, 1,5-pentanediol, 1,2-hexanediol and 1,6-hexanediol; and tri- or more hydric alcohols such as glycerin, mesoerythritol and pentaerythritol. One or two or more kinds of these glycols can be used. The content of the water-soluble glycol is preferably from 1 to 30% by weight in the ink composition of the invention.

Similarly to the above-mentioned water-soluble glycol, in order to prevent nozzle clogging, the ink composition for ink jet recording of the invention can also be allowed to contain a preservative or an antifungal agent. Examples thereof include sodium benzoate, pentachlorophenol sodium, sodium 2-pyridinethiol-1-oxide, sodium sorbate, sodium dehydroacetate and 1,2-dibenzisothiazolin-3-one (Proxel CAL, Proxel BDN, Proxel GXL, Proxel XL-2 and Proxel TN manufactured by Avecia). One or two or more thereof can be used preferably in an amount of 0.01 to 0.5% by weight in the ink composition of the invention.

From the viewpoints of improvement in print density and liquid stability, the pH of the ink composition for ink jet recording of the invention is adjusted preferably to 6 to 11, and more preferably to 7 to 10. In order to adjust the pH of the ink composition within the above-mentioned range, it is preferred that the ink composition is allowed to contain an inorganic alkali such as sodium hydroxide, potassium hydroxide or lithium hydroxide, or a tertiary amine having 6 to 10 carbon atoms such as ammonia, triethanolamine, ethyldiethanolamine, diethylethanolamine or tripropanolamine, as a pH adjustor. One or two or more of the pH adjustors can be used in an amount of 0.01 to 2% by weight in the ink composition of the invention.

As the ink jet recording method of the invention, any method can be used as long as the ink is ejected as fine droplets through nozzles and the droplets are deposited on the recording medium.

Some of them will be described below. First, there is an electrostatic attraction system. As this system, there is a system of applying an intense electric field between the nozzle and an accelerating electrode disposed in front of the nozzle, continuously ejecting the ink dropwise through the nozzle, and while the ink droplets fly between deflecting electrodes, printing information signals are given to the deflecting electrodes to perform recording, or a system of ejecting ink droplets in response to printing information signals without deflection.

The second system is a system of applying pressure to an ink solution by means of a small pump and mechanically vibrating the nozzle with a quartz oscillator or the like, thereby forcibly ejecting ink droplets through the nozzle. The ejected ink droplets are electrified simultaneously with the ejection, and while the ink droplets fly between deflecting electrodes, printing information signals are given to the deflecting electrodes to perform recording.

The third system is a system using a piezoelectric element, in which pressure and printing information signals are simultaneously applied to the ink by a piezoelectric element, thereby ejecting ink droplets to perform recording.

The fourth system is a system of rapidly expanding the volume of the ink by the action of thermal energy, in which the ink is heat-foamed by microelectrodes in response to printing information signals, thereby ejecting ink droplets to perform recording.

Any one of the above-mentioned systems can be used in the ink jet recording method using the ink composition of the invention. The application of the ink composition for ink jet recording of the invention can realize excellent ejection stability and nozzle clogging resistance, even when any ink jet recording system is employed.

The recorded matter of the invention is one obtained by performing ink jet recording, using at least the above-mentioned ink composition. This recorded matter has high density, is improved in fixing properties of the ink, particularly the pigment in the ink, and can form images such as letters and figures excellent in rubbing resistance. Further, the generation of unpleasant odors or poisonous gases due to the copolymerization component monomers and oligomers of the resin emulsion does not occur.

EXAMPLES

The ink compositions of the invention will be illustrated in greater detail with reference to the following examples, but the invention should not be construed as being limited thereto.

(Preparation of Resin Emulsions A and B)

A reaction vessel equipped with a stirrer, a reflux condenser, a dropping device and a thermometer was charged with 1,000 parts of ion-exchanged water and 3 parts of sodium lauryl sulfate, and the temperature thereof was elevated to 70° C. with stirring while replacing the air with nitrogen. The internal temperature was maintained at 70° C., and 3 parts of potassium persulfate was added thereto as a polymerization initiator. After dissolution thereof, a monomer emulsion previously prepared according to each formulation shown in Table 1 was continuously added dropwise to the reaction solution over a period of 4 hours. Further, in order to promote the polymerization reaction of monomers and oligomers with a molecular weight of 2,000 or less, one part of sodium lauryl sulfate was additionally added, followed by stirring for 1 hour. The resin emulsion thus obtained was cooled to room temperature, and adjusted to a solid content of 15% by weight and pH 8.0 by adding ion-exchanged water and aqueous ammonia, thereby obtaining each of resin emulsions A and B. The compounding amounts indicated in Table 1 are all represented by parts by weight.

|  | Resin Emulsion | | | |
| --- | --- | --- | --- | --- |
|  | A | B | C | D |
| Ultrapure Water | 450 | 450 | 450 | 450 |
| Sodium Lauryl Sulfate | 3 | 3 | 3 | 3 |
| Acrylamide | 20 | 20 | 20 | 20 |
| Styrene | 300 | — | 300 | — |
| Methyl Methacrylate | — | 300 | — | 300 |
| Butyl Acrylate | 640 | 640 | 640 | 640 |
| Methacrylic Acid | 30 | 30 | 30 | 30 |

(Preparation of Resin Emulsions C and D)

A reaction vessel equipped with a stirrer, a reflux condenser, a dropping device and a thermometer was charged with 1,000 parts of ion-exchanged water and 3 parts of sodium lauryl sulfate, and the temperature thereof was elevated to 70° C. with stirring while replacing the air with nitrogen. The internal temperature was maintained at 70° C., and 4 parts of potassium persulfate was added thereto as a polymerization initiator. After dissolution thereof, a monomer emulsion previously prepared according to each formulation shown in Table 1 was continuously added dropwise to the reaction solution over a period of 4 hours. After the completion of the dropwise addition, aging was performed for 3 hours. The resin emulsion thus obtained was cooled to room temperature, and adjusted to a solid content of 15% by weight and pH 8.0 by adding ion-exchanged water and aqueous ammonia, thereby obtaining each of resin emulsions C and D. The compounding amounts indicated in Table 1 are all represented by parts by weight.

(Preparation of Pigment Dispersion A)

After 300 g of a commercially available acidic carbon black "MA-100" (pH 3.5, manufactured by Mitsubishi Chemical Corporation) was thoroughly mixed with 1,000 g of water, 500 g of sodium hypochlorite (effective chlorine concentration: 12%) was added dropwise thereto, followed by stirring at 100 to 105° C. for 12 hours. The dispersion stock solution thus obtained was filtered through a Toyo Roshi No. 2 filter (manufactured by Advantis), and washed with water well. The resulting wet cake was redispersed in 3,000 g of water, and desalted to a conductivity of 2 mS/cm through a reverse osmosis membrane. Further, this pigment dispersion (pH: 8 to 10) was concentrated to a pigment concentration of 10% by weight to obtain pigment dispersion A comprising the surface-treated carbon black. Pigment dispersion A was diluted 2,000 times with ultrapure water, and then, the average particle size was measured with a particle size distribution analyzer, Microtrac UPA 150 (manufactured by Nikkiso co., Ltd.). As a result, it was 130 nm.

(Preparation of Pigment Dispersion B)

A commercially available carbon black, "S170" (manufactured by Degusa Huls AG) (100 g), 150 g of a water-soluble resin dispersing agent "Joncryl J62" (manufactured by Johnson Polymer Corp.), 6 g of sodium hydroxide and 250 g of water were mixed together, and dispersed in a ball mill with zirconia beads for 10 hours. The dispersion stock solution thus obtained was filtered through a glass fiber filter paper, GA-100 (manufactured by Advantec Toyo Kaisha, Ltd.), and further washed with water. The resulting wet cake was redispersed in 5,000 g of water, and desalted to a conductivity of 2 mS/cm through a reverse osmosis membrane. Further, the pigment dispersion was concentrated to a pigment concentration of 15% by weight, and the carbon black was dispersed using the polymeric dispersing agent to obtain pigment dispersion B. Pigment dispersion B was diluted 3,000 times with ultrapure water, and then, the average particle size was measured with a particle size distribution analyzer, Microtrac UPA 150 (manufactured by Nikkiso co., Ltd.). As a result, it was 120 nm.

(Preparation of Ink Compositions)

For each of ink compositions 1 to 7, resin emulsion A, B, C or D and pigment dispersion A or B were added in compounding amounts (both in terms of solid content) shown in Table 2, and 5 parts of glycerol, 5 parts of 2-pyrrolidone, 2 parts of ethanol, 1 part of Olfine E 1010 (manufactured by Nissin Chemical Industry Co., Ltd.), 3 parts of triethylene glycol mono-n-butyl ether, 5 parts of 1,2-hexanediol and 0.3 part of Proxel XL-2 (manufactured by Avecia) were added. Then, triethanolamine was added to adjust the pH to 7.5, and ultrapure water was added to bring the total amount to 100 parts. The resulting mixed solution was stirred at room temperature for 2 hours, and then, filtered through a polytetrafluoroethylene membrane filter having a pore size of 5 μm (manufactured by Millipore, Ltd) to obtain each of ink compositions 1 to 7 (Examples 1 to 4 and Comparative Examples 1 to 3).

Further, the total amounts (ppm) of monomers and oligomers with a molecular weight of 2,000 or less contained in ink compositions 1 to 7 thus obtained are shown in Table 2. These values were calculated as the total amounts in the respective ink compositions from their measured values obtained by measuring the amounts of copolymerization component monomers and oligomers with a molecular weight of 2,000 or less contained in resin emulsions A to D and pigment dispersions A and B, with a gas chromatograph, 5890A (manufactured by Hewlett-Packard Development Company).

standing in the environment of 70° C. for 1 week. The viscosities of each ink composition before and after standing were measured with an oscillating viscometer (manufactured by Yamaichi Electronics Co., Ltd.), and storage stability was judged from the rate of change thereof on the basis of the following criteria:

Judgment A: The rate of change due to standing was less than ±5%.

TABLE 2

|  | Example 1 | Example 2 | Example 3 | Example 4 | Comparative Example 1 | Comparative Example 2 | Comparative Example 3 |
|---|---|---|---|---|---|---|---|
| Ink Composition | 1 | 2 | 3 | 4 | 5 | 6 | 7 |
| Pigment Dispersion A | 8% | 8% | 8% | 8% | 8% | 8% | — |
| Pigment Dispersion B | — | — | — | — | — | — | 3% |
| Resin Emulsion A | 1% | 3% | 12% | — | — | — | 1% |
| Resin Emulsion B | — | — | — | 3% | — | — | — |
| Resin Emulsion C | — | — | — | — | 3% | — | — |
| Resin Emulsion D | — | — | — | — | — | 3% | — |
| Amount of Monomers and Oligomers with Molecular Weight of 2,000 (ppm) | 51 | 148 | 369 | 496 | 1188 | 1755 | 135 |
| Fixing Property | B | A | A | A | A | A | A |
| Ejection Property | A | A | B | A | C | C | B |
| Storage Property | A | A | B | A | C | C | B |
| OD Value | A | A | A | A | A | A | C |

(Evaluation Tests of Ink Compositions)

For each of the compositions prepared in Examples 1 to 4 and Comparative Examples 1 to 3, the following evaluations 1 to 4 were made.

<Evaluation 1: Fixing Property (Line Marker Resistance)>

An ink jet recording apparatus PX-V700 (manufactured by Seiko Epson Co., Ltd.) was filled with each ink composition prepared, and a pattern including solid images and letters was printed. After the recorded matter thus obtained was air dried for 24 hours, the printed letters were rubbed with a water-based yellow fluorescent pen Zebra Pen 2 (manufactured be Zebra Co., Ltd.) at a pen pressure of 300 g/15 mm², and the presence or absence of a smudge was visually observed. The results thereof were judged on the basis of the following criteria:

Judgment A: No smudge occurred at all when the same portion was rubbed twice.

Judgment B: No smudge occurred when rubbed once, but a smudge occurred when rubbed twice.

Judgment C: A smudge occurred when rubbed once.

<Evaluation 2: Ejection Property>

An ink jet recording apparatus PX-V700 (manufactured by Seiko Epson Co., Ltd.) was filled with each ink composition prepared, and a pattern including solid images and ruled lines was printed in the environment of 40° C. When print disorders due to nozzle missing, ink flight deflection and the like occurred, a recovery (cleaning)-operation device attached to the recording apparatus was executed in each case. The number of the above-mentioned cleaning operations required in continuous printing of 100 pages was counted, and the results thereof were judged on the basis of the following criteria:

Judgment A: No cleaning was required.

Judgment B: Less than 3 cleaning operations were required.

Judgment C: 3 to less than 5 cleaning operations were required.

<Evaluation 3: Storage Property>

Sixty grams of each sample prepared was put in a 100-g bottle, and the bottle was sealed hermetically, followed by Judgment B: The rate of change due to standing was from ±5% to less than ±10%.

Judgment C: The rate of change due to standing was ±10% or more.

<Evaluation 4: OD Value>

An on-demand type ink jet recording apparatus PX-V700 manufactured by Seiko Epson Corporation was filled with each ink composition prepared, and then, 10% solid printing was performed in a mode of "plain paper-fast". As the recording media, 4 kinds of paper, Xerox P and Xerox 4024 (both manufactured by Fuji Xerox Co., Ltd.) as neutral plain paper, EPP (manufactured by Seiko Epson Corporation) as acidic plain paper, and Xerox R (manufactured by Fuji Xerox Co., Ltd.) as recycled paper, were used to obtain recorded matter. After printing, the recorded matter was allowed to stand in a general environment for 1 hour. Then, the OD value of the solid portion was measured with a Gretag densitometer (manufactured by Gretag Machbeth), and the results of measurement were judged on the basis of the following criteria:

Judgment A: The OD value was 1.30 or more.

Judgment B: The OD value was from 1.20 to less than 1.30.

Judgment C; The OD value was less than 1.20.

The results of judgment of the above evaluations 1 to 4 are collectively shown in Table 2.

As is apparent from Table 2, ink compositions 1 t 4 (Examples 1 to 4) within the scope of application of the invention give judgment A or B in all evaluation items to realize all of sufficient fixing property of the recorded matter, high OD value, and stable ejection property and storage property. On the other hand, ink compositions 5 and 6 (Comparative Examples 1 and 2) containing monomers and oligomers with a molecular weight of 2,000 or less in an amount of more than 1,000 ppm in the ink composition secure fixing property of the recorded matter and high OD value, but results in giving judgment C in ejection property and storage property evaluations. Further, ink composition 7 (Comparative Example 3) containing pigment dispersion B dispersed by using the polymeric dispersing agent is good in fixing property of the recorded matter, ejection property and storage property, but unsatisfactory to obtain the desired OD value, resulting in giving judgment C.

Further, of the ink compositions of Examples, ink compositions 2 and 4 (Examples 2 and 4) each containing the resin emulsion in an amount of 3% by weight based on the total amount of the ink composition, in which compositions the amount of monomers and oligomers with a molecular weight of 2,000 or less is 1,000 ppm or less, gives good fixing property and also high OD value, and further judgment A for both the evaluations of fixing property and storage property. Thus, the good results are obtained.

As has been described in detail above, according to the present invention, there is provided the ink composition for ink jet recording which gives sufficient fixing properties to the recorded matter, has high density, and is good in ejection stability and storage stability. Further, the ink jet recording method and recorded matter using the ink composition are suitably provided.

While the present invention has been described in detail and with reference to specific embodiments thereof, it will be apparent to one skilled in the art that various changes and modifications can be made therein without departing from the spirit and scope thereof.

This application is based on Japanese Patent Application No. 2005-094832 filed Mar. 29, 2005, the contents thereof being herein incorporated by reference.

What is claimed is:

1. An ink composition for ink jet recording comprising at least a resin emulsion and a surface-treated pigment, wherein the amount of monomers and oligomers with a molecular weight of 2,000 or less contained in the resin emulsion is 1,000 ppm or less based on the total amount of the ink composition, wherein the content of the resin emulsion is within the range of 1 to 10% by weight based on the total amount of the ink composition, wherein the surface-treated pigment is a surface-treated pigment which is dispersed by a carboxyl group existing on a surface of the pigment and without a dispersing agent, and wherein the resin emulsion is present in the ink composition in an amount such that the ink composition has good fixing and storage properties in accordance with the following criteria:

(a) when a pattern including printed letters is printed with the ink to form a recorded matter and the recorded matter is air dried for 24 hours, the printed letters do not smudge when rubbed twice with a water-based yellow fluorescent pen; and (b) when sixty grams of the ink composition is hermetically sealed in a 100-g bottle and left to stand at 70 C for 1 week, the viscosity of the ink composition before and after standing changes at a rate of less than +/−5% as measured with an oscillating viscometer.

2. The ink composition according to claim 1, wherein the resin emulsion contains at least one monomer selected from the group consisting of an alkyl (meth)acrylate and an aromatic vinyl compound, as a copolymerization monomer(s).

3. The ink composition according to claim 1, wherein the surface-treated pigment is a surface treated carbon black.

4. The ink composition according to claim 1, wherein the surface-treated pigment has an average particle size ranging from 100 to 200 nm.

5. The ink composition according to claim 1, wherein the content of the surface-treated pigment is within the range of 2 to 15% by weight based on the total amount of the ink composition.

6. An ink jet recording method comprising ejecting droplets of an ink and depositing the droplets on a recording medium to perform printing, wherein the ink is the ink composition according to claim 1.

7. Recorded matter recorded by the ink jet recording method according to claim 6.

* * * * *